United States Patent
Dervaux et al.

(10) Patent No.: US 7,625,175 B2
(45) Date of Patent: Dec. 1, 2009

(54) LINK DEVICE BETWEEN AN ENCLOSURE FOR PASSING COOLING AIR AND A STATOR NOZZLE IN A TURBOMACHINE

(75) Inventors: Alexandre Dervaux, Paris (FR); Sabine Bermond, Paris (FR)

(73) Assignee: SNECMA, Paris (FR)

( * ) Notice: Subject to any disclaimer, the term of this patent is extended or adjusted under 35 U.S.C. 154(b) by 485 days.

(21) Appl. No.: 11/385,659

(22) Filed: Mar. 22, 2006

(65) Prior Publication Data

US 2006/0245912 A1 Nov. 2, 2006

(30) Foreign Application Priority Data

Mar. 23, 2005 (FR) .................................. 05 02880

(51) Int. Cl.
*F01D 9/02* (2006.01)
(52) U.S. Cl. ....................................... 415/135; 415/115
(58) Field of Classification Search ................. 415/115, 415/135, 191, 211.2
See application file for complete search history.

(56) References Cited

U.S. PATENT DOCUMENTS

| 3,721,089 A | 3/1973 | Morrison et al. |
| 5,603,531 A | 2/1997 | Maier |

2002/0076319 A1* 6/2002 Oya et al. .................... 415/115

FOREIGN PATENT DOCUMENTS

| DE | 196 44 543 A1 | 4/1998 |
| EP | 0 040 268 | 11/1981 |
| EP | 0 919 774 A3 | 6/1999 |
| EP | 1 164 250 A3 | 12/2001 |
| EP | 1 291 491 A2 | 3/2003 |
| EP | 1 308 674 A3 | 5/2003 |
| FR | 2 027 667 | 10/1970 |
| GB | 790248 | 2/1958 |
| JP | 2000-274261 | 10/2000 |

OTHER PUBLICATIONS

U.S. Appl. No. 11/385,929, filed Mar. 22, 2006, Dervaux, et al.

* cited by examiner

*Primary Examiner*—Edward Look
*Assistant Examiner*—Dwayne J White
(74) *Attorney, Agent, or Firm*—Oblon, Spivak, McClelland, Maier & Neustadt, L.L.P.

(57) ABSTRACT

A link device between an enclosure for passing cooling air and a stator nozzle in a turbomachine, the device comprising metal tubes having their ends mounted in leaktight manner in orifices in a casing and in orifices in the stator nozzle, each tube including a bellows between its ends and accommodating relative displacements and changes of alignment between the orifices in the casing and the orifices in the nozzle.

5 Claims, 2 Drawing Sheets

LINK DEVICE BETWEEN AN ENCLOSURE FOR PASSING COOLING AIR AND A STATOR NOZZLE IN A TURBOMACHINE The present invention relates to a link device between an enclosure for passing cooling air, such as a source of cooling air or a plenum enclosure, and a stator nozzle in a turbomachine, such as an airplane turbojet or turboprop.

BACKGROUND OF THE INVENTION

In a turbomachine, the stator nozzles that are exposed to high temperatures, in particular those downstream from the combustion chamber, include internal cavities for passing a flow of cooling air coming from a radially outer enclosure, part of which air can be diffused into the passage for passing the flow of combustion gas via holes formed in the vanes, and part of it can be exhausted into a radially inner enclosure.

Link means are provided between these enclosures and the stator nozzles to allow cooling air to pass, while minimizing losses and leaks at the interfaces, the link means comprising metal tubes having their ends mounted in leaktight manner in orifices in a casing and in orifices in the stator nozzles.

While the turbomachine is in operation, the casing, and above all the stator nozzles, expand thermally and are subjected to high levels of vibration, thereby generating relative displacements and changes in alignment between the orifices in the casing and those in the nozzles.

To compensate for these relative displacements and changes in alignment, link tubes are used having ends that are enlarged in such a manner as to allow for a small amount of pivoting of the ends of the tubes in the orifices in the casing and in the nozzles, these ends being mounted as tight-fits in the orifices in order to ensure that the assembly is sufficiently leaktight.

Nevertheless, that solution is not satisfactory insofar as mounting the ends of the tubes as tight-fits limits the extent to which they can pivot and leads to zones that present high degrees of wear due to friction against the inside surfaces of the orifices in the casing and in the nozzles, which can lead to leaks at said ends, and even to the link tubes being lost or failing.

OBJECTS AND SUMMARY OF THE INVENTION

A particular object of the invention is to provide a solution to this problem that is simple, inexpensive, and effective.

To this end, the invention provides a link device between an enclosure for passing cooling air and a stator nozzle in a turbomachine such as an airplane turbojet, the device comprising metal tubes having their ends mounted in leaktight manner in orifices in a casing of the enclosure and in orifices in the stator nozzle, wherein a middle portion of each tube is formed by a metal bellows whose ends are secured to rings engaged in leaktight manner in the orifices of the casing and of the nozzle, respectively.

The bellows associated with each tube deform resiliently and serve to accommodate the offsets and changes in alignment between the orifices of the casing and the orifices of the nozzle that result from the turbomachine operating, while nevertheless ensuring continuity in the fluid link between the above-specified enclosure and the stator nozzle, and while avoiding wear at the ends of the tubes, and while applying prestress to the tubes.

Advantageously, the end of the tube engaged in the orifice in the stator nozzle has a frustoconical outside surface urged to press against a complementary frustoconical surface of the orifice in the stator nozzle by resiliently prestressing said bellows.

The other end of the tube may be cylindrical, for example, and it may press against a sealing washer mounted in an annular groove in the inner cylindrical surface of the orifice in the casing of the enclosure.

The invention also provides a turbomachine such as an airplane turbojet or turboprop, the turbomachine including at least one device as defined above.

BRIEF DESCRIPTION OF THE INVENTION

The invention can be better understood and other characteristics and advantages of the invention appear on reading the following description made by way of non-limiting example and with reference to the accompanying drawings, in which.

MORE DETAILED DESCRIPTION

Figure 1:
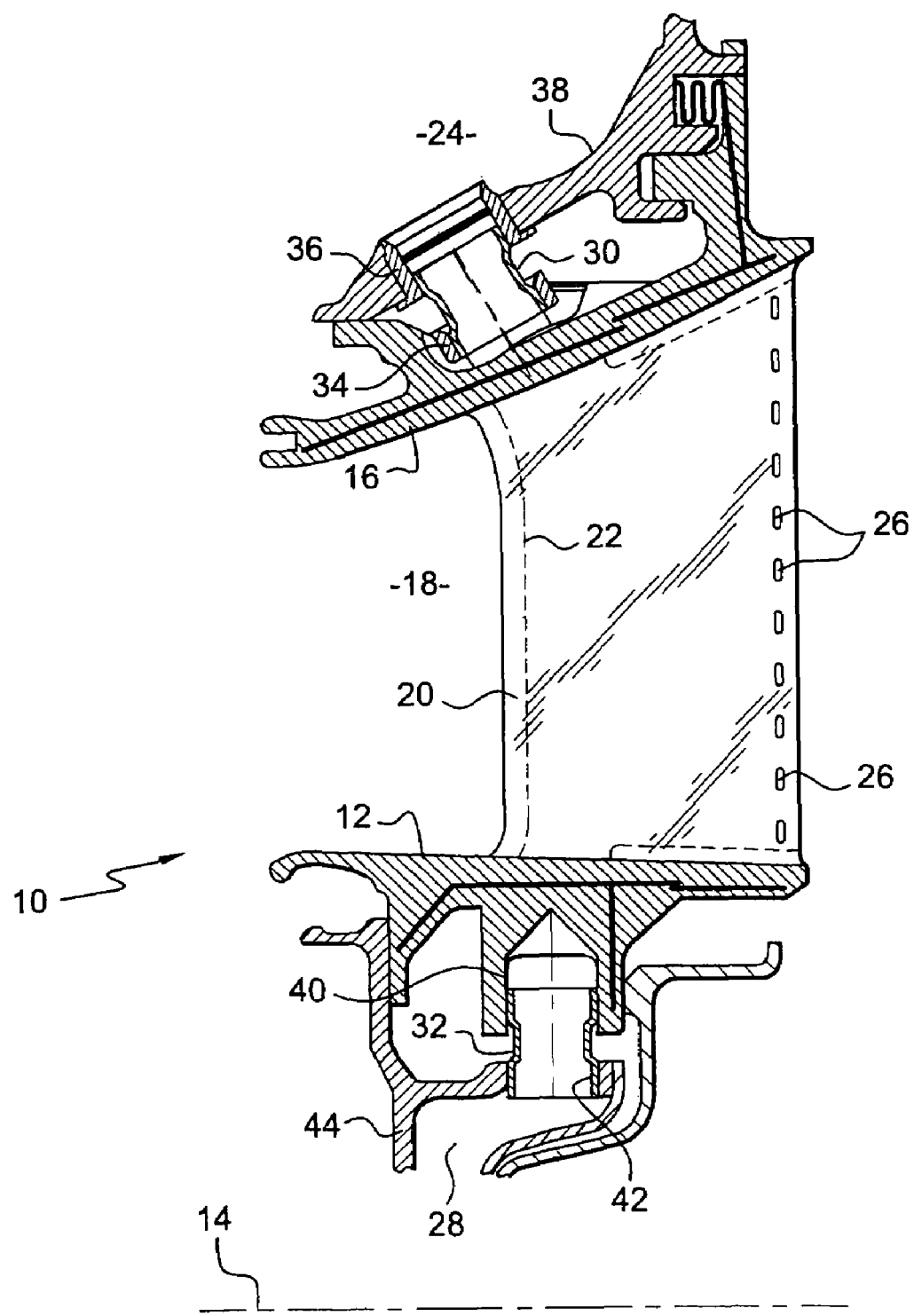
FIG. 1 is a fragmentary diagrammatic half-view in axial section of a stator nozzle connected to two cooling air flow enclosures via link devices of the prior art.

FIG. 1 is a fragmentary diagrammatic half-view in axial section of a stator nozzle 10 in a turbomachine, having a radially inner annular wall 12 of axis 14 and a radially outer frustoconical wall 16 of axis 14, sloping towards the axis 14 at its upstream end, the annular walls defining between them an annular gas flow passage 18 for gas coming from a combustion chamber (not shown) of the turbomachine, with vanes 20 extending radially between the annular walls.

Each vane 20 has an internal cavity 22 for circulating cooling air coming from a feed enclosure 24 located radially outside the wall 16 of the nozzle, part of the air being diffused into the annular passage 18 via slots 26 in the vanes 20, and part being exhausted into an enclosure 28 located radially inside the wall 12 of the nozzle.

The cavities 22 in the vanes are connected to the outer and inner enclosures 24 and 28 by link devices comprising respective metal tubes 30 and 32.

The tubes 30 for passing air from the outer enclosure 24 to the cavities 22 in the vanes have their ends engaged in leaktight manner in bushings 34, 36 secured in orifices formed in the wall 16 of the nozzle, and in orifices formed in a casing 38 of the enclosure 24, respectively.

The tubes 32 for passing air from the cavities 22 in the vanes to the inner enclosure 28 have their ends engaged in leaktight manner in orifices 40, 42 in the wall 12 of the nozzle and in an annular rim of a casing 44 of the enclosure 28, respectively.

When the turbomachine is in operation, the thermal expansion of the stator nozzle 10 and the vibration of the turbine engine lead to relative displacements in translation and in rotation for each tube 30, 32 between the nozzle 10 and the casings of the enclosures 24 and 28.

Figure 2:
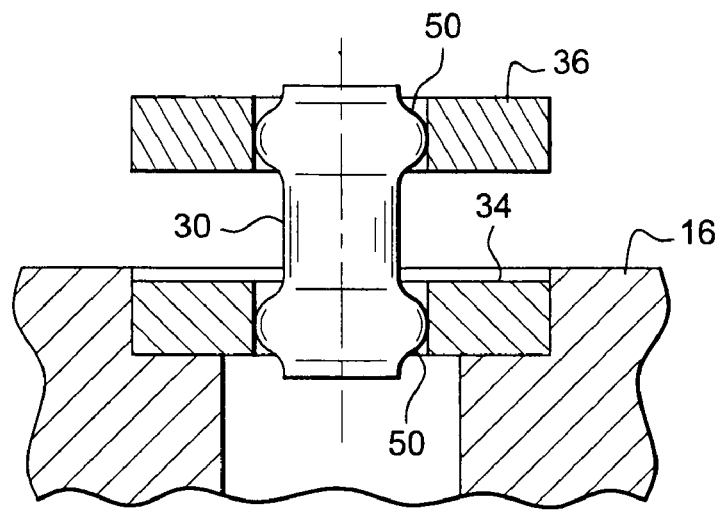
FIG. 2 is a fragmentary diagrammatic view in axial section of a prior art link device.

In the prior art shown diagrammatically in FIG. 2, each tube 30 of a link device has enlarged ends 50 or ends that present an outside surface constituting a segment of the sphere, which ends are engaged in stationary bushings 34, 36 and are free to slide therein in order to compensate for the above-mentioned relative displacements.

In order to guarantee sufficient leaktightness between the tube 30 and the stationary bushings 34, 36, the ends 50 are mounted at tight-fits in said stationary bushings, thereby greatly restricting their ability to slide and to pivot, and leading to high degrees of wear due to friction, which can lead to leaks or even to the tube becoming completely unserviceable.

Figure 3:
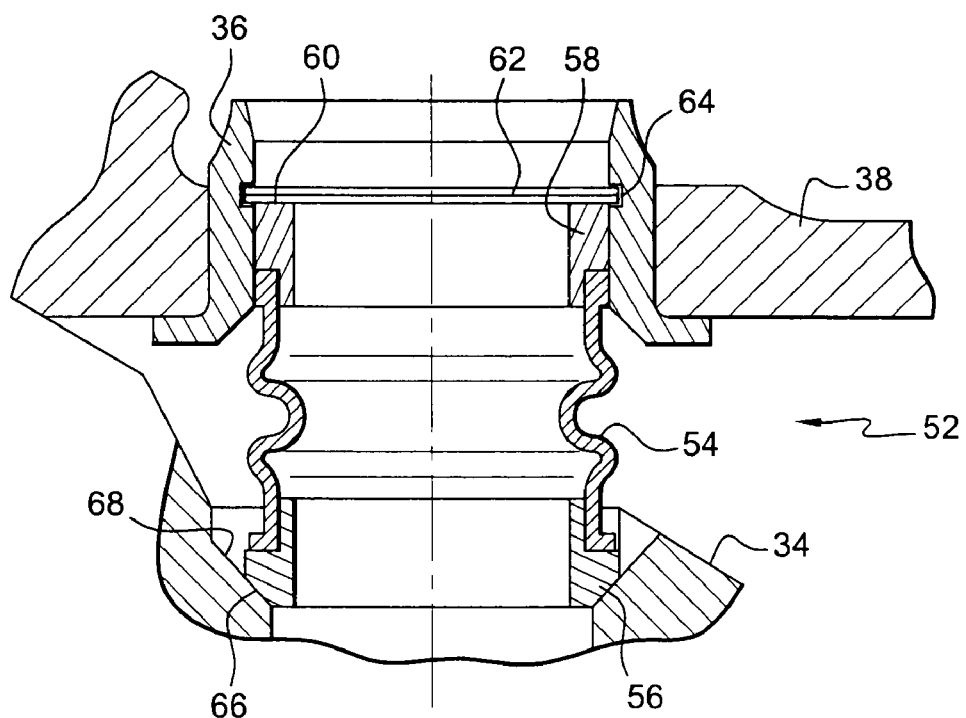
FIG. 3 is a fragmentary diagrammatic view in axial section of the link device of the invention.

FIG. 3 is an axial section view of a device of the invention in which each tube 52 includes a metal bellows 54 forming the middle portion of the tube, with cylindrical rings 56, 58 being secured to the ends thereof and engaged in leaktight manner in the orifices of the stationary bushings 34, 36, respectively.

In the example shown, the free end 60 of the outer ring 58 is cylindrical and is pressed against a sealing washer 62 mounted in an annular groove 64 in the inner cylindrical surface of the stationary bushing 36, and the free end of the ring 56 has a frustoconical outside surface 66 bearing against a complementary frustoconical surface 68 of the stationary bushing 34.

In a variant, the rings 56 and 58 could have cylindrical free ends pressing respectively against corresponding annular surfaces of the bushing 34 and of the sealing washer 62.

Resiliently prestressing the bellows 54 serves to urge the frustoconical surface of the ring 56 to press against the surface 68 of the stationary bushing 34, with this resilient prestress being determined in association with the stiffness of the bellows 54 in order to guarantee satisfactory sealing for the assembly.

While the turbomachine is in operation, all of the relative displacements in translation and in rotation between the casing 38 and the nozzle are compensated by resilient deformation of the bellows in the tubes 52.

The device of the invention may also be mounted between the nozzle 10 and the casing 44 of the inner enclosure 28.

The bellows of the tubes are typically made of an alloy of the Inconel type or of stainless steel.

The device of the invention is capable of absorbing relatively large amounts of displacement between the casing of the enclosure and the nozzle, while nevertheless ensuring continuity in the fluid links between the casing and the nozzle, and while minimizing the risks of wear to the link tubes and minimizing the stresses that are applied thereto.

What is claimed is:

1. A link device between an enclosure for passing cooling air and a stator nozzle in a turbomachine, the device comprising metal tubes having their ends mounted in leaktight manner in orifices in a casing of the enclosure and in orifices in the stator nozzle, wherein a middle portion of each tube is formed by a metal bellows whose ends are secured to rings engaged in leaktight manner in the orifices of the casing and of the nozzle, respectively, wherein the bellows is resiliently prestressed so as to urge the rings against surfaces of the orifices of the casing and of the nozzle, respectively, wherein the ring that is engaged in the orifice of the nozzle has a frustoconical outside surface which is in axial abutment against a complementary frustoconical surface of the orifice of the nozzle.

2. A device according to claim 1, wherein each ring engaged in the orifice of the casing is cylindrical and is pressed against a sealing washer mounted in an annular groove in the inner cylindrical surface of the orifice in the casing.

3. A turbomachine including nozzles connected to outer and inner enclosures by link device according to claim 1.

4. A link device between an enclosure for passing cooling air and a stator nozzle in a turbomachine, the device comprising metal tubes having their ends mounted in leaktight manner in orifices in a casing of the enclosure and in orifices in the stator nozzle, wherein a middle portion of each tube is formed by a metal bellows whose ends are secured to rings engaged in leaktight manner in the orifices of the casing and of the nozzle, respectively, wherein each ring engaged in the orifice of the casing is cylindrical and is in abutment against a sealing washer mounted in an annular groove in the inner cylindrical surface of the orifice in the casing by the bellows which is resiliently prestressed, and wherein the ring that is engaged in the orifice of the nozzle has a frustoconical outside surface which is in axial abutment against a complementary frustoconical surface of the orifice of the nozzle.

5. A device according to claim 1, wherein the bellows is resiliently prestressed axially to urge said rings towards the casing and the nozzle, respectively.

* * * * *